United States Patent [19]
Lehmann

[11] Patent Number: 5,239,859
[45] Date of Patent: Aug. 31, 1993

[54] METHOD AND APPARATUS FOR LEAK TESTING A HOLLOW BODY

[76] Inventor: Martin Lehmann, Obere Farnbühlstrasse 1, 5610 Wohlen, Switzerland

[21] Appl. No.: 693,586

[22] Filed: Apr. 30, 1991

Related U.S. Application Data

[63] Continuation-in-part of Ser. No. 599,424, Oct. 18, 1990, Pat. No. 5,029,464, which is a continuation of Ser. No. 474,164, Feb. 2, 1990, abandoned, which is a continuation of Ser. No. 115,408, Nov. 2, 1987, abandoned.

[51] Int. Cl.$^5$ .............................................. G01M 3/36
[52] U.S. Cl. ....................................... 73/49.2; 73/49.3
[58] Field of Search ......................... 73/49.2, 49.3, 52

[56] References Cited

U.S. PATENT DOCUMENTS

| | | | |
|---|---|---|---|
| 2,936,611 | 5/1960 | Le Mat et al. | 73/49.2 |
| 3,800,586 | 4/1974 | Delatorre et al. | 73/49.2 |
| 4,019,370 | 4/1977 | Allocco, Jr. | 73/45.1 |
| 4,078,421 | 3/1978 | Gastaldo et al. | 73/49.2 |
| 4,350,038 | 9/1982 | Soncrant | 73/49.2 |
| 4,542,643 | 9/1985 | Himmelstein | 73/49.2 |
| 4,942,758 | 7/1990 | Cofield | 73/49.2 |

FOREIGN PATENT DOCUMENTS

| | | |
|---|---|---|
| 1474553 | 2/1967 | France . |
| 2518263 | 6/1983 | France . |
| 534350 | 2/1973 | Switzerland . |

Primary Examiner—Hezron E. Williams
Assistant Examiner—Joseph W. Roskos
Attorney, Agent, or Firm—Antonelli, Terry, Stout & Kraus

[57] ABSTRACT

A method and apparatus for leak testing a hollow body wherein the hollow body is placed in a test chamber. The hollow body is exposed to one of a positive or negative differential pressure between an internal pressure of the hollow body and a pressure in the test chamber. A pressure prevailing in the test chamber is tapped off from the test chamber at two points in time, with a signal being generated of a pressure differential between the values of the prevailing pressure in the test chamber at the two points of time. The tightness or change in volume of the hollow body is determined in dependence upon the generated pressure differential signal.

49 Claims, 6 Drawing Sheets

METHOD AND APPARATUS FOR LEAK TESTING A HOLLOW BODY

CROSS-REFERENCE TO RELATED APPLICATIONS

This application is a continuation-in-part application of U.S. application Ser. No. 07/599,424, filed Oct. 18, 1990 now Pat. No. 5,029,464, which was a continuation Application of U.S. application Ser. No. 07/474,161, filed Feb. 2, 1990, now abandoned, which was a continuation Application of U.S. Ser. No. 115,408, filed Nov. 2, 1987, now abandoned.

This is application is also related to U.S. application Ser. No. 07/557,792, filed Jul. 12, 1990, as a continuation-in-part of U.S. application Ser. No. 07/474,164, filed Feb. 2, 1990, now abandoned.

FIELD OF THE INVENTION

The present invention relates to a method and apparatus for testing tightness of at least one hollow body and for detecting a change in volume caused by pressure stress applied to walls of the hollow body such as, for example, a flexible hollow body such as a coffee package.

BACKGROUND OF THE INVENTION

In the packaging of certain foodstuffs such as sweeteners and coffee or also medications such as, for example, effervescent tablets, it is essential that the packaging containers are sealed tight against the environment in order to prevent the packaged goods from becoming contaminated by, for example, atmospheric humidity. The goods are sometimes packed in containers such as cans or pouches. These containers are generally dimensionally stable or flexible hollow bodies which are fitted with lids or closable sections which can be opened, but which in the closed state are intended to tightly seal the interior of the hollow body.

Various procedures, for example, welding, are used in the manufacture of such containers. In addition to the tightness of such hollow bodies, also the rigidity of the walls of the dimensionally stable containers, especially in the area of junction points, is an essential criterion determining their useability. Excessively rigid or excessively weak sections such as weld seams, may result in cracks forming when the container is in use, for example, in areas where parts of different rigidity are joined.

SUMMARY OF THE INVENTION

One object of the present invention is to create a testing method for such hollow bodies as well as a corresponding apparatus for testing such hollow bodies in a simple and greatly reliable manner.

In particular, the present invention proposes a method wherein the hollow body is placed in a test chamber and is subjected to a positive or negative pressure difference between the internal pressure of the hollow body and the pressure in the test chamber, whereby conclusions can be drawn regarding the tightness of the hollow body or its change in volume from the behavior of the pressure in the test chamber.

When such a hollow body, which is optionally and preferably filled, it introduced into a test chamber and the chamber is filled with a test gas, preferably air, having a positive or negative pressure difference relative to the internal pressure of the hollow body, a pressure equalization will take place between the test chamber pressure and the internal pressure of the hollow body depending on the tightness or leakage of the hollow body. The rate at which this equalization process takes place is a measure of the magnitude of any leakage that is present. Similarly, any increase or decrease in the volume of the hollow body will exert an effect which is a measure of the elasticity of the walls of the hollow body. The volume will increase when the pressure difference is directed outwards from the hollow body and it will decrease when the pressure difference is directed from the test chamber towards the interior of the hollow body.

According to one embodiment of the present invention, the pressure in the test chamber is preferably constantly regulated according to a given time sequence and a controlled variable used is evaluated. If a leak exists in the hollow body undergoing testing, then in order to maintain a constant pressure in the test chamber, a certain amount of pressure medium as a controlled variable must be added to or removed from the chamber per unit of time. This amount corresponds to the per-unit time amount of pressure medium flowing from the chamber into the interior of the hollow body or vice versa. The amount of pressure medium per unit time which has to be supplied to or, when the pressure difference is directed outwards from the interior of the hollow body, must be removed from the test chamber is preferably evaluated as a measured variable.

To apply a predetermined pressure, practically as the initial pressure to the test chamber and, after sealing off the pressurized chamber containing the hollow body, in order to derive the above mentioned criteria from the pressure curve, a second chamber may be pressurized to a given pressure and joined to the test chamber in order to produce the pressure difference. The pressure in the test chamber, once the two chambers are joined, is derived from the pressure level set in the further chamber and the volume ratio of the two chambers. In order to increase a measurement signal, the test chamber should preferentially be prepressurized with a positive or negative pressure relative to the atmospheric pressure.

Further, to create a defined reference pressure for the purpose of evaluating the internal pressure of the test chamber and in order to be able to perform the evaluation on the basis of the pressure difference measurement, the chamber is connected with a reference pressure system prior to evaluation. Then the reference pressure system is disconnected from the chamber and its pressure is the reference pressure for subsequent evaluation of the chamber pressure.

Because the reference pressure system is first joined to the chamber, the pressure which adjusts within it is the same as the pressure in the test chamber. If the reference pressure system is then disconnected from the chamber, the pressure value then prevailing in the test chamber is stored in the reference pressure system and is used in the subsequent evaluation procedure as the reference pressure for a pressure difference measurement.

Furthermore, by carrying out the evaluation of the chamber pressure at a particular point in time, the process of the evaluation becomes extremely simple. At a given point in time a check is carried out to ascertain whether the ACTUAL chamber pressure corresponds to the DESIRED chamber pressure which has been selected in advance, for example, for tight hollow bodies. If the ACTUAL test pressure chamber is compared at two or more points in time, or event continuously in time, with DESIRED pressure values for two or more points in time or with a DESIRED pressure-time curve, then especially in the case of very small leaks the resolving power of the evaluation process is increased, for example, by integrating the comparative result or the DESIRED-ACTUAL difference.

Furthermore, pre-selected DESIRED pressure values or DESIRED pressure curves should preferentially be stored and, when carrying out the test mentioned above, they should be compared as comparative values with the recorded ACTUAL values in order to determine whether a hollow body should, for example, be rejected because of excessive leakage or because it has excessively stiff or excessively elastic wall sections.

In accordance with advantageous features of the apparatus of the present invention, at least one tightly sealable test chamber is provided for receiving at least one hollow body, with regulatable pressure-generating devices applying pressure to the test chamber. Pressure-recording devices are connectable to the test chamber and have at least one output for a signal which is dependent upon a test chamber pressure.

Advantageously, the pressure generating elements are used as control elements, and pressure recording elements are used to measure the control variable in a test chamber pressure control circuit. Flow meters are provided between the pressure-generating elements and the test chamber to record the amount of pressure medium $$\frac{\Delta V}{\Delta t}$$

supplied to or removed from the test chamber as the controlled variable.

In accordance with further features of the present invention, the pressure generating elements are linked through at least one first shut-off member with a prechamber, with the prechamber being, in turn, connected through at least one second shut-off member with the test chamber.

In accordance with the present invention, the pressure-recording elements comprise at least one pressure difference sensor having one input directly linked with the test chamber and a second input connected with the test chamber by way of a reference chamber which is closable by way of a shut-off device.

In accordance with still further features of the present invention, a control unit is provided by which the shut-off device is closed once a given pressure is reached in the test chamber in order to store a reference pressure at the pressure difference sensor and by means of which also the output of the pressure difference sensor is open for evaluation purposes.

In accordance with further features of the present invention, storage means are provided for data corresponding to at least one DESIRED pressure or at least one DESIRED PRESSURE CURVE, with the pressure recording element and the storage means being connected to a comparator arrangement in order to compare the behavior of the pressure in the test chamber in the case of a test object with a DESIRED behavior.

In lieu of a pressure difference sensor arrangement, in accordance with another technical approach of the present invention, it is possible for the pressure difference signal to be electronically formed whereby pressure values prevailing in the test chamber are tapped off at different points in time using the first pressure value as reference pressure value in comparing the second pressure value with the first pressure value and electronically generating a pressure difference signal.

More particularly, in accordance with a method of the present invention, in order to test at least one of tightness of a hollow body or a change in volume of the hollow body caused by a pressure stress applied to walls of the hollow body, the hollow body is placed in a test chamber and is exposed to one of a positive or negative differential pressure difference between an internal pressure of the hollow body and the pressure in the test chamber. The pressure prevailing in the test chamber is tapped off from the test chamber, and a signal is generated in accordance with a difference of pressure values between tapped off pressure at two subsequent points in time, with a determination of at least one of the tightness in change of volume of the hollow body being determined from the generated signal.

Advantageously, the pressure tapped off at the first of the points in time or signal generated in accordance with the tapped off pressure at the first point in time is stored.

A second chamber may be provided, with the second chamber being loaded to a given pressure and with the second chamber being connected to a test chamber to generate the differential pressure difference.

The test chamber may be initially provided with a positive or negative pressure and, in accordance with further features of the present invention, the generated signal may be evaluated at least at one given point in time or continuously evaluated over the course of the signal during a predetermined period of time.

The generated signal may advantageously be compared with a predetermined value and a conclusion may be reached indicating a lack of tightness of the hollow body as the result of such comparison.

In accordance with further features of an apparatus in accordance with the present invention for at least one of testing tightness of a hollow body and detecting a change in volume of the hollow body caused by pressure stresses applied to walls of the hollow body, the apparatus may be provided with at least one tightly closable test chamber for accommodating the hollow body to be tested, with a pressure generating means being provided for applying one of a positive or negative pressure to the test chamber. Means are provided for enabling a tapping off of pressure from the test chamber with difference forming means and time control means also being provided. The difference forming means are adapted to generate an output signal in accordance with a difference of the pressure tapped off at two subsequent points in time, with the points in time being controlled by the time control means.

Advantageously, in accordance with the present invention, an output of the difference forming means is connected to an input of a difference forming unit, with a reference signal source being connected to a second input of the difference forming unit, and an output of the difference forming unit being adapted to control an adjustment of the pressure generating means so as to provide a negative feedback control of the pressure generated by the pressure generating means within the test chamber on a value output from the reference signal source.

A shut-off valve may be provided for connecting the test chamber to a prechamber, with a further shut-off valve being provided for connecting the prechamber with the pressure generating means.

Control means in accordance with the present invention may include a means for outputting a start signal for the time control means once a preselected value is reached within the test chamber so as to initiate a control of two subsequent points in time.

The output signal may, in accordance with the present invention, be connected to one input of a difference forming unit, with a reference signal source being connected to a second input of the difference forming unit.

Advantageously, the reference signal source may be adapted to output a reference signal varying in time.

The method and apparatus of the present invention is extremely advantageously used for flexible hollow bodies such as coffee packages and may also be applied to at least partially filled hollow bodies.

As can readily be appreciated, since only one chamber, that is, a test chamber, is positively or negatively pressure loaded and since it is this one chamber from which the pressure measurements are tapped, in accordance with still further features of the present invention, the test chamber may well be an interior of the container itself in situations where open containers such as, for example, plastic bottles are to be tested.

More particularly, an apparatus may be provided for at least one of testing tightness of a hollow body and a detecting of a change in the volume of the hollow body caused by pressure stresses applied to the walls of the hollow body wherein a pressure generating means applies one of a positive or negative pressure to an interior of the hollow body relative to a pressure surrounding the exterior of the hollow body with pressure difference sensors being provided with two pressure difference inputs both connected to the interior of the hollow body, and with one of the inputs being connected to the hollow body by a shut-off valve means. A second of line from one of the pressure inputs to the shut-off valve means is unbranched for enabling a testing and has a volume considerably less than a volume of the hollow body.

In accordance with the method of the present invention wherein the hollow body is utilized as the test chamber, a pressure medium is introduced into the hollow body so as to apply a pressure to the hollow body different from an external pressure of the hollow body, with the hollow body being connected to a pressure difference sensor by first and second inputs, with a valve connecting the hollow body to the first input of the pressure difference sensor being closed so as to provide a reference pressure value for the pressure difference sensor, with the pressure of the hollow body then being detected over a period of time at the second input of the pressure difference sensor. The reference pressure and the detected pressure are compared to provide information on the tightness of the hollow body. The pressure in the hollow body is held constant over a given period of time by introducing further pressure medium or releasing pressure medium from the hollow body, with the amount of pressure medium introduced or removed from the hollow body over a given time period being evaluated to provide information as to the tightness of the hollow body.

The above and other objects, features, and advantages of the present invention will become more apparent from the following description when taken in connection with the accompanying drawings which show, for the purpose of illustration only, several examples in accordance with the present invention.

DETAILED DESCRIPTION

Figure 1:
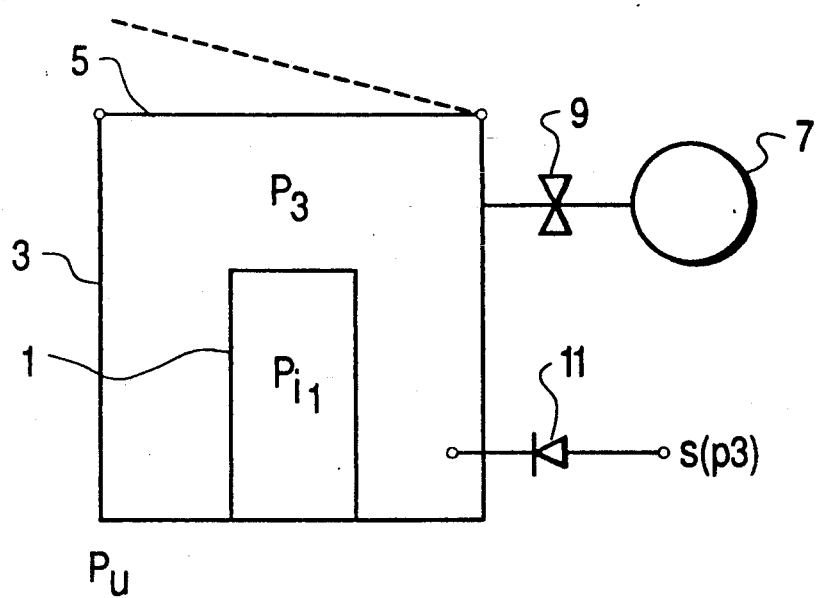
FIG. 1 is a functional block diagram of the fundamental structure of an apparatus according to the present invention and operating according to the method of the present invention.

Referring now to the drawings wherein like reference numerals are used throughout the various views to designate like parts and, more particularly, to FIG. 1, according to this figure, in accordance with the method and apparatus of the present invention, a hollow body 1 which is to be tested for tightness such as, for example, leaks, or to determine whether its volume changes as a result of pressure stress and elastic deformation of its walls is placed in a test chamber 3, for example, through an opening which is tightly closable by a lid 5. An internal pressure $p_{i1}$, which normally corresponds to the ambient pressure $p_u$ exists in the interior of the hollow body 1. Once the test chamber 3 has been hermetically sealed, it is pressurized by connecting a source of pressure medium 7 to the test chamber 3. The pressure medium used is a gas, preferentially, air and, as a result, a positive or negative differential pressure is generated inside the test chamber 3, with the reference to the internal pressure $P_{i1}$ inside the hollow chamber 1.

The pressure inside the test chamber 3 is designated $P_3$ in FIG. 1. Then the pressure system, consisting of the test chamber 3 and the hollow body 1 to be tested, is separated from the source of pressure medium 7 by means of, for example, a shut-off valve 9 and allowed to stand by itself. If the hollow body is tight to the gas used and if its walls are so rigid that forces resulting from the pressure difference between $p_3$ and $p_{i1}$ acting on the walls do not bring about any substantial deformations, then using a pressure sensor, which could be a mechanical/electrical converter, for example, a piezoelectric pressure sensor, as shown in diagrammatic form at 11 in FIG. 1, an output signal $s(p_3)$ is recorded qualitatively and depicted in FIG. 2a.

Figure 2A:
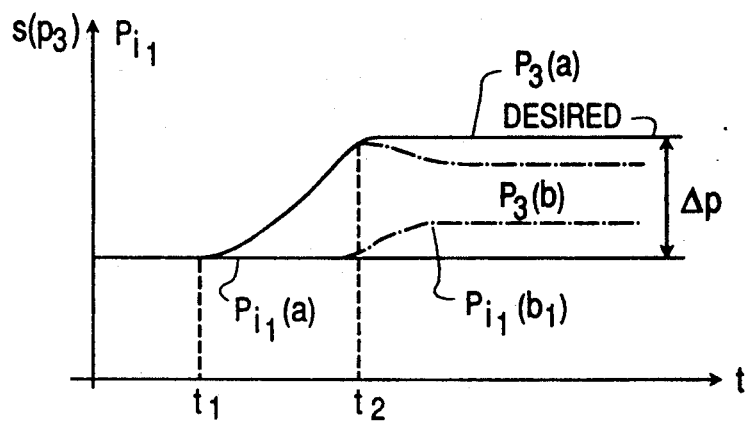
FIG. 2a is a graphical illustration of the internal pressure in the hollow body and the internal pressure in the test chamber over time, given a pressure difference between the test chamber and the interior of the hollow body which is directed toward the interior of the hollow body and given fully rigid and tight walls of the hollow body on the one hand, and body walls which are tight but yield under the applied pressure stresses.

FIG. 2a presents a qualitative plot over time t of the pressure in the test chamber 3 corresponding to the signal $s(p_3)$, and also of the internal pressure $p_{i1}$ in the hollow body 1. Up to the time $t_1$, for example, until the hollow body 1 is introduced into the test chamber 3 and the latter is tightly closed by means of the cover 5, $p_3$ and $p_{i1}$ are identical to the ambient pressure $p_u$. At time $t_1$, the process of pressurizing the test chamber 3 by the pressure medium source 7 commences and the pressure in the chamber 3 rises. In the case mentioned above, in which the hollow body has rigid and tight walls, the internal pressure $p_{i1}$ remains unaffected by the change in pressure in the test chamber 3. At time $t_2$, the source 7 is separated from the test chamber 3 and in the present case the test chamber pressure $p_3(a)$ remains at least approximately constant as does the internal pressure $p_{i1}(a)$ the hollow body 1.

If the walls of the hollow body 1 are not absolutely rigid in the above-mentioned sense but undergo deflection inwards or outwards at least at certain points and in accordance with the applied pressure difference $\Delta p$, which may be positive or negative, then when the differential pressure is directed towards the interior of the hollow body, the qualitative curves $p_3(b)$ or $p_{i1}(b)$ indicated by the dash-dot lines are obtained. Similar circumstances prevail when the differential pressure is directed towards the test chamber 3.

As can be seen from these qualitative curves, after a shorter or longer period of time, both pressures tend asymptotically towards a different constant limit value.

Figure 2B:
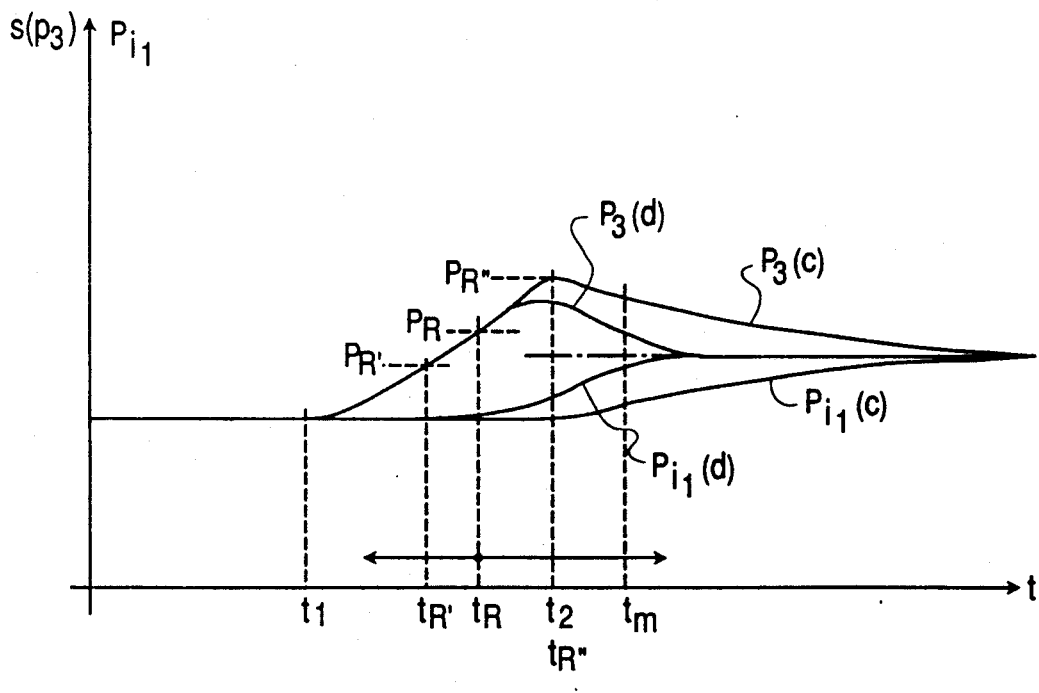
FIG. 2b is a graphical illustration similar to FIG. 2a depicting different leakage rates of the hollow body.

FIG. 2b is a plot, similar to that shown in FIG. 2a, of the conditions prevailing when leaks of various size exist in the hollow body 1. Given a relatively small leak rate, the internal pressure of the hollow body 1 and the pressure between the test chamber 3 and the hollow body 1 equalize at a relatively slow rate in accordance with the qualitative curves p(c), while for larger leaks the equalization takes place at an increasingly fast rate, as shown, for example, by the curves p(d). If a DESIRED curve $p_3$, for example, as shown by $p_3(b)$, is known to apply in general to intact, tight hollow bodies 1, taking account also of any change in volume in the hollow body 1 caused by the differential pressure stress, then at the output side of the sensor 11 it is possible to judge, by comparing the ACTUAL curve with such DESIRED curve, to what extent a tested hollow body is tight or not, or whether it should be rejected or not.

Figure 3:
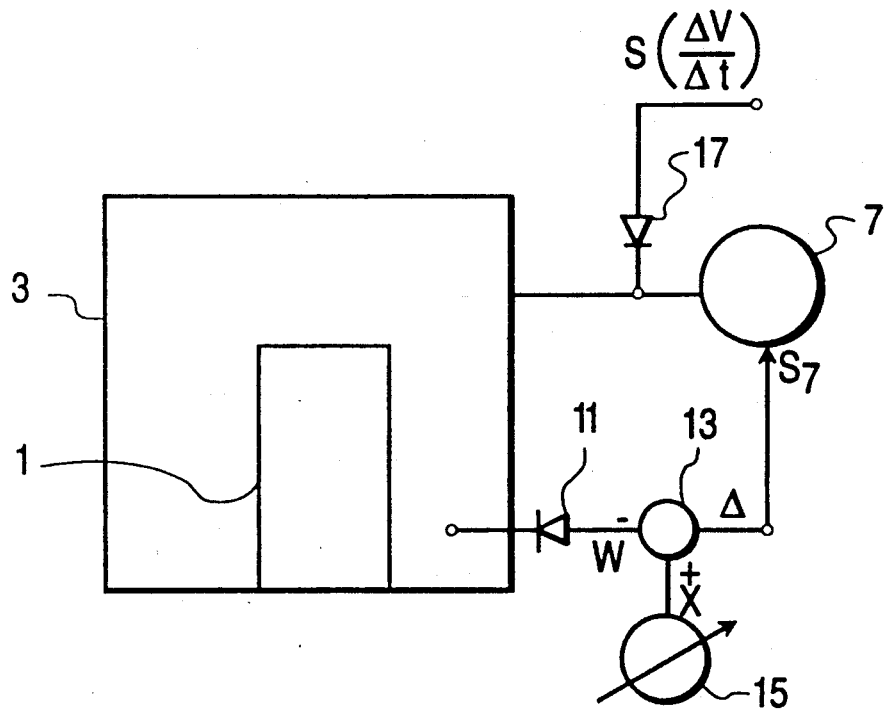
FIG. 3 shows, on the basis of the depiction in FIG. 1, a first embodiment of the invention in which the test chamber pressure is held constant and the controlled variable is evaluated.

For this purpose, in accordance with FIG. 1, the pressure $p_3$ is measured, for example, with reference to the ambient atmosphere having pressure $p_u$ and, advantageously and as will be described further below, the difference between pressure $p_3$ and a given reference pressure is measured. As shown in FIG. 3, the pressure in the test chamber 3 is held constant and the amount of pressure medium or gas added to or removed from the test chamber per unit of time, or integrated over a given period of time, is recorded as the measured variable.

As shown in FIG. 3, after the hollow body 1 to be tested is introduced into the test chamber 3, which is then tightly closed, the chamber is pressurized by a source of pressure medium 7, which may be air, or in turn the chamber may be evacuated, and the internal pressure of the test chamber 3 is recorded as the controlled variable W using a pressure sensor 11. The controlled variable W is compared at a differential measuring unit 13 with the reference pressure X or with a signal corresponding to the reference pressure and the resulting control difference $\Delta$ is applied to the control input $S_7$ of the source 7. Using the latter as the regulating element, the pressure in the test chamber 3 is adjusted to the DESIRED value X which has been set at a preselector device 15. The volume of medium per unit time to be supplied by the source 7, which is the regulating element for test chamber 3, is measured by a flow sensor 17 as a signal s $$\frac{\Delta V}{\Delta t}$$

which is then integrated for further evaluation, example, over a given period of time.

The curves obtained for the signal s $$\frac{\Delta V}{\Delta t}$$

are to those shown in FIGS. 2a and 2b.

Figure 4:
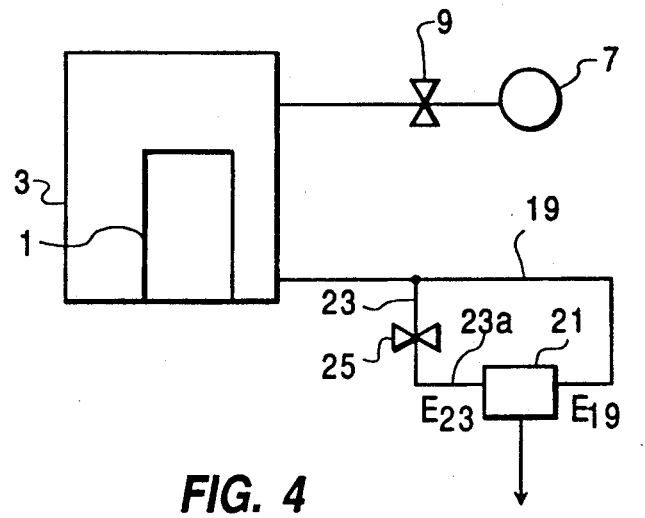
FIG. 4 shows, on the basis of the depiction in FIG. 1, a preferred embodiment of the pressure-recording system in which the pressure is measured as pressure difference.

FIG. 4 shows a preferred embodiment of the method of measuring the pressure in the test chamber 3 as depicted in FIG. 1. During the pressure build-up phase between times $t_1$ and $t_2$, the test chamber is connected via a line 19 with one input $E_{19}$ of a pressure difference sensor 21, for example, a piezo-electric sensor. Via a second line 23 fitted with a shut-off valve 25, the test chamber 3 is further connected with a second input $E_{23}$ of the pressure difference sensor 21. At time $t_R$ as shown in FIG. 2b, the shut-off valve 25 is closed so that the pressure prevailing at that time in the test chamber 3 remains built-up in the section of line 23a between shut-off valve 25 and the second input $E_{23}$ which is used as the reference pressure system. This pressure in the connecting line 23a acts as the reference pressure on the pressure difference sensor 21 since the line 19 remains open in the following measurement phase for $t > t_2$, a pressure difference is measured at the pressure difference sensor 21 relative to the pressure prevailing in the test chamber at the time $t_R$. As can be seen from FIG. 2b, the time tR is adjusted on a case by case basis to give optimum measurement resolution, indicated by $t_{R'}$, $t_{R''}$ and resulting reference pressures $p_R$, $p_{R'}$, and $p_{R''}$.

Figure 5:
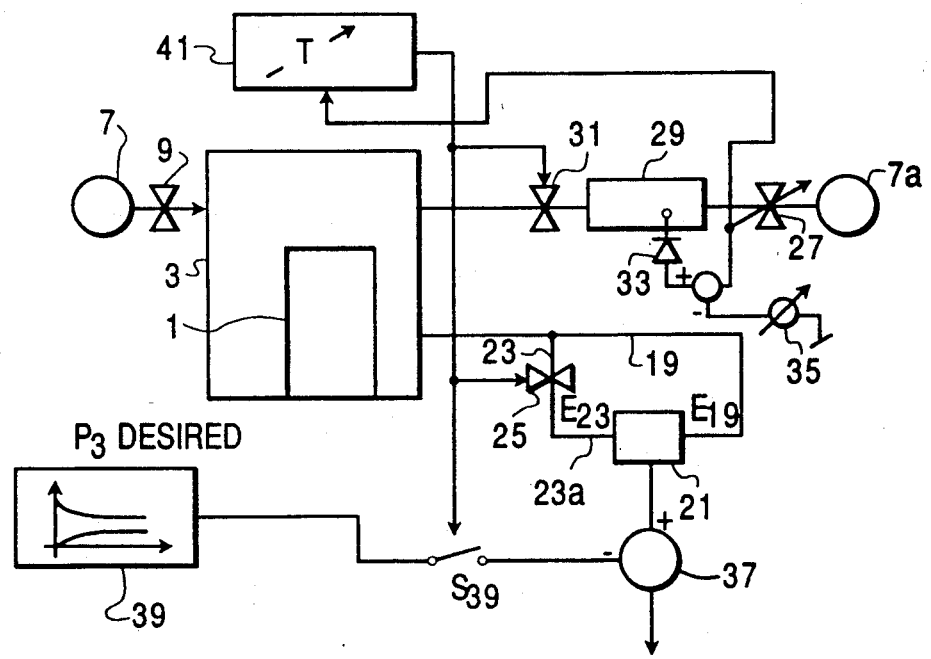
FIG. 5 shows, on the basis of the depiction in FIG. 1 or FIG. 4, a preferred embodiment of the apparatus for applying pressure to the test chamber as well as a time control apparatus for controlling the time of the individual phases of the method.

Proceeding from the diagram in FIG. 4, FIG. 5 presents a preferred embodiment of the means of pressurizing the test chamber 3. For this purpose, a test gas source such as, for example, a pump 7a, is connected via a shut-off valve 27 with a reference volume in a reference chamber 29. The reference chamber 29 is connected via a further shut-off valve 31 with the test chamber 3. Using source 7a and with valve 27 initially open and valve 31 shut, the reference chamber 29 is filled with a test gas and a pressure sensor 33 is used to measure the pressure in the reference chamber 29. Once the pressure measured by the pressure sensor 33 attains the reference pressure adjusted at a reference signal source 35, the valve 27 is closed. Next, valve 31 is opened, thus forming a communicating system between the test chamber 3 and the reference chamber 29 and the test gas pressure is equalized according to the volumes in the reference chamber 29 and the test chamber 3. Following an equalization phase corresponding to the time section $t_1$, $t_2$ in FIG. 2b, the course of the pressure difference is measured using the pressure difference sensor 21 as described on the basis of FIG. 4, or at a given measuring time $t_m$, with any differences between a DESIRED pressure difference and an ACTUAL pressure difference being recorded as shown in FIG. 2b.

As further shown in FIG. 5, the output of the pressure difference sensor 21 is fed, for example, to a comparator 37 to which, at a second input, a standard curve is supplied from a storage and output device 3, for example, a computer. The deviations of the instantaneous test result from a given DESIRED result can be delivered at any point in time at the output of the differentiator 37 and, on the basis of these deviations a decision can be made regarding the condition of the hollow body 1 that is being tested. Instead of comparing the time curves, it is also possible at any given point in time corresponding to $t_m$ to compare the ACTUAL pressure difference at the output of the pressure difference sensor 21 with DESIRED values stored in the unit 39. For this purpose, a conventional timer unit, as shown in diagrammatic form 41, is provided. When the given pressure is attained in the reference chamber 29, the timer is activated and, in accordance with preselected time intervals T, it operates the valves 31, 25 and can also set the DESIRED value at $S_{39}$.

According to this procedure, and using the arrangement described, it is possible to detect leaks reliably and rapidly over an extremely broad range. Similarly, as was explained on the basis of FIG. 2a, it is possible to detect deviations in the shape characteristics of the hollow bodies from the anticipated shape characteristics, as may happen, for example, if the wall sections are unacceptably rigid or unacceptably elastic.

In the embodiments described hereinabove in connection with FIGS. 4 and 5, a differential sensor 21 was employed to hold a pressure value prevailing in the test chamber 3 at a first point in time occurring, for example, upon a closing of the shut-off valve 25 and thus storing the prevailing pressure value in a line section 23a of a second or connecting line 23 at one input of the differential pressure sensor 21. The pressure value prevailing at the first point in time, that is, when the shut-off valve 25 is closed, was then compared with a pressure value prevailing in the test chamber 3 at a subsequent point in time, that is, a point in time subsequent to the storing or holding of the prevailing pressure at the line section 23a. Consequently, with the above described of FIGS. 4 and 5, one pressure value at a first point in time and prevailing in the test chamber is taken as a reference pressure value which is compared with a second pressure value prevailing in the test chamber 3, which second pressure value prevails in the test chamber 3 at some subsequent point in time.

The above described measuring technique or concept may, in accordance with the present invention, also be carried out electronically rather then by utilizing a pressure difference sensor as in the embodiments 4 and 5.

Figure 5A:
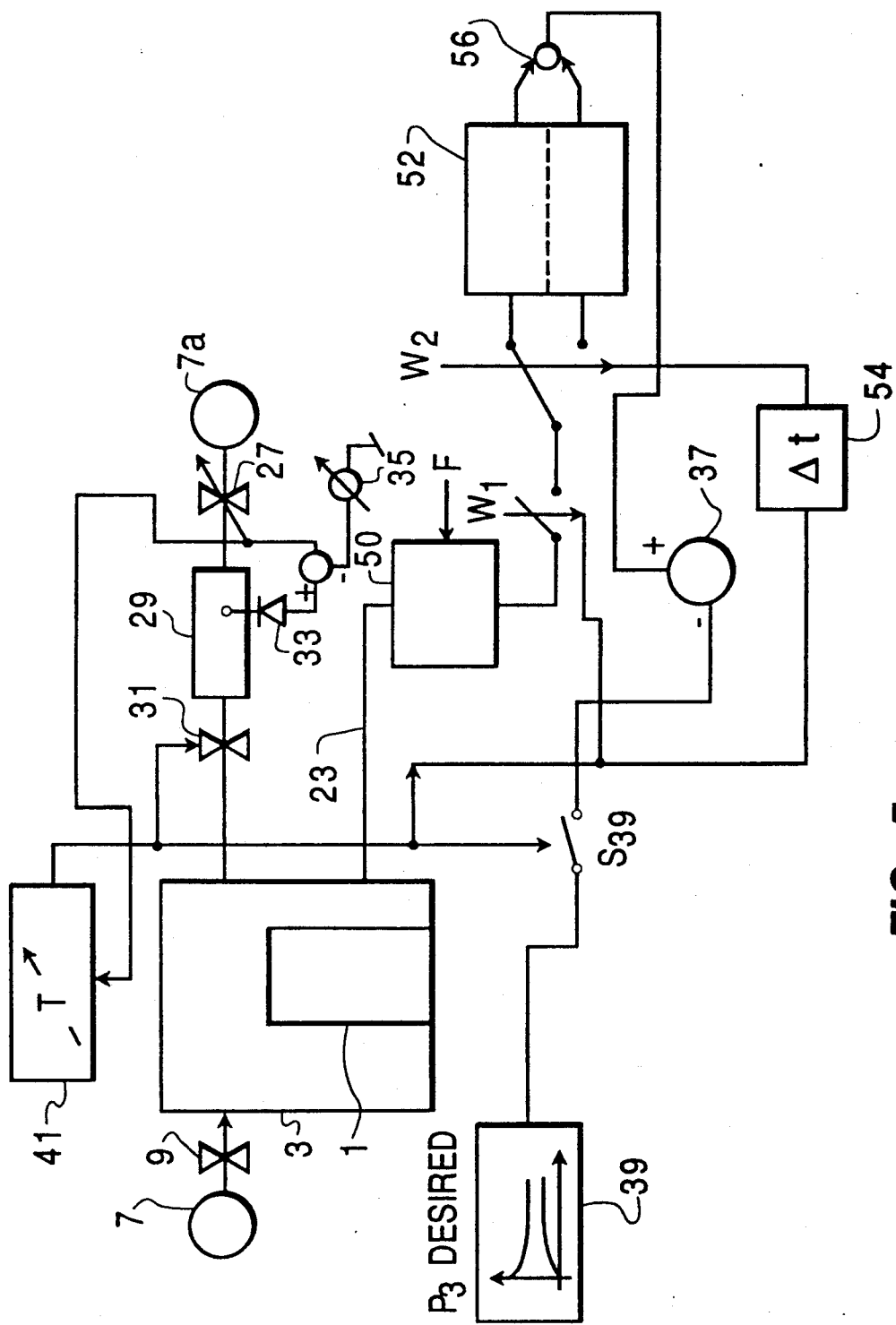
FIG. 5a is a schematic view of yet another embodiment of the apparatus of the present invention wherein a generated pressure signal difference, based on two different pressure values in a test chamber of the apparatus at two subsequent points in time, is electronically effected.

More particularly, as shown in FIG. 5a, prevailing pressure in a test chamber 3 may be tapped by a connecting line 23 arranged between the test chamber 3 and a pressure/electrical signal transducer 50 which may, for example, be an absolute pressure/electrical signal transducer such as a piezo-transducer working against a reference force F. An electrical output of the transducer 50 representing the pressure prevailing in the test chamber 3 is led, as schematically shown, by way of a switch $W_1$ and a switch $W_2$ to a first storage area I of a conventional electronic storage unit 52 once the timer unit 41 activates the switch $W_1$ at a first point in time.

The timer unit 41 may then subsequently, after a predetermined time interval, activate the switch $W_1$ at a point in time later than the first point of time so that the output signal of the transducer 50 is led to a second area II of the storage unit 52 upon an activation of the switch $W_2$ by an output signal of a conventional time lag unit 54 which may be formed as a separate component from or an integral portion of the timer unit 41.

Upon storage of the electric data in the storage areas I and II of the storage unit 52 relating to the pressure prevailing in the test chamber 3 at a first point in time and to the pressure prevailing in the test chamber 3 at a second point in time, the data is outputted from the storage areas I, II and supplied to a conventional difference forming unit 56, wherein a signal representing the pressure differential of the two prevailing pressure values is formed and led to a conventional differentiator 37 and processed in the manner described hereinabove in connection with the embodiment of FIG. 5.

In all other respects, the pressure difference signal, as described hereinabove in connection with FIGS. 4 and 5, is processed in the same manner as the pressure difference signal from the pressure difference sensor, with the difference residing in the formation of the pressure difference signal in the embodiment of FIG. 5a occurring electronically. In the embodiment of FIG. 5a, a pressure value prevailing in the test chamber 3 at one point in time is the reference pressure for forming a pressure difference with respect to a pressure value prevailing in the test chamber 3 but taken at a subsequent period of time.

Figure 6:
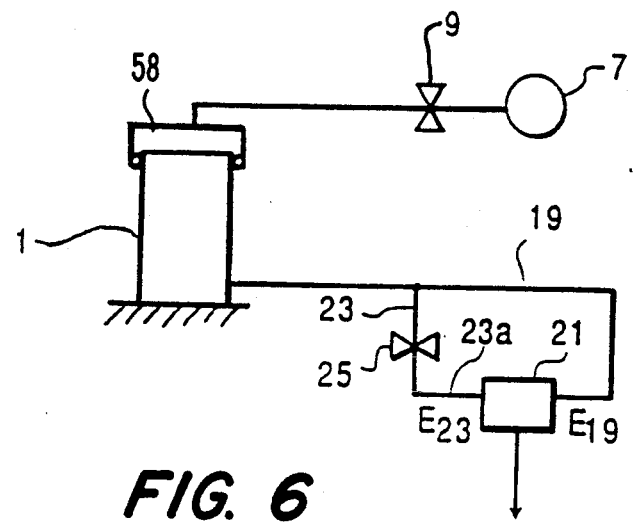
FIGS. 6–8 are schematic views of further embodiments of the present invention wherein the container itself forms a test chamber.
Figure 7:
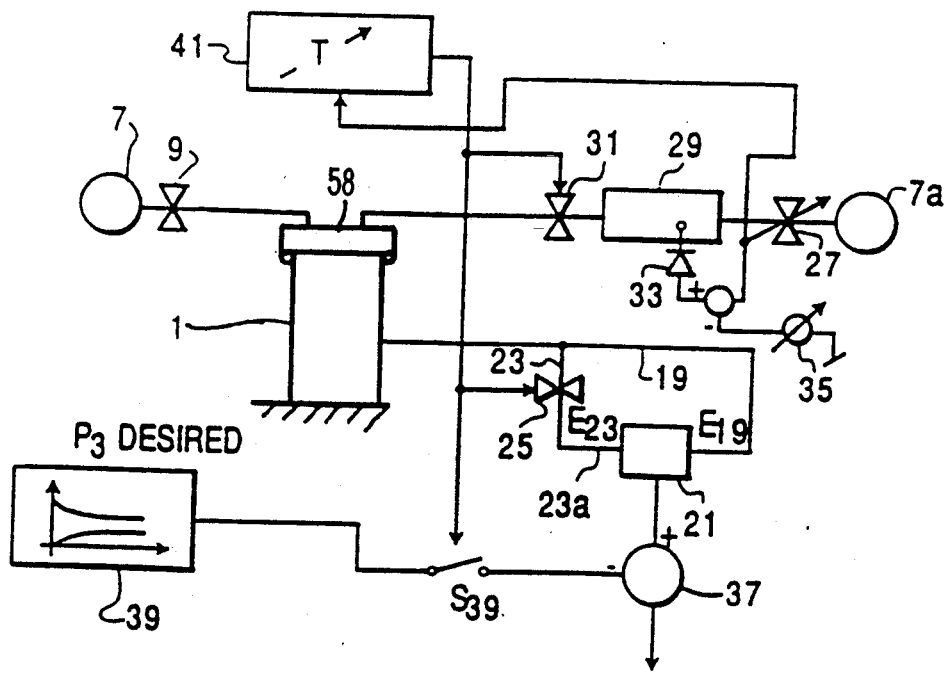
Figure 8:
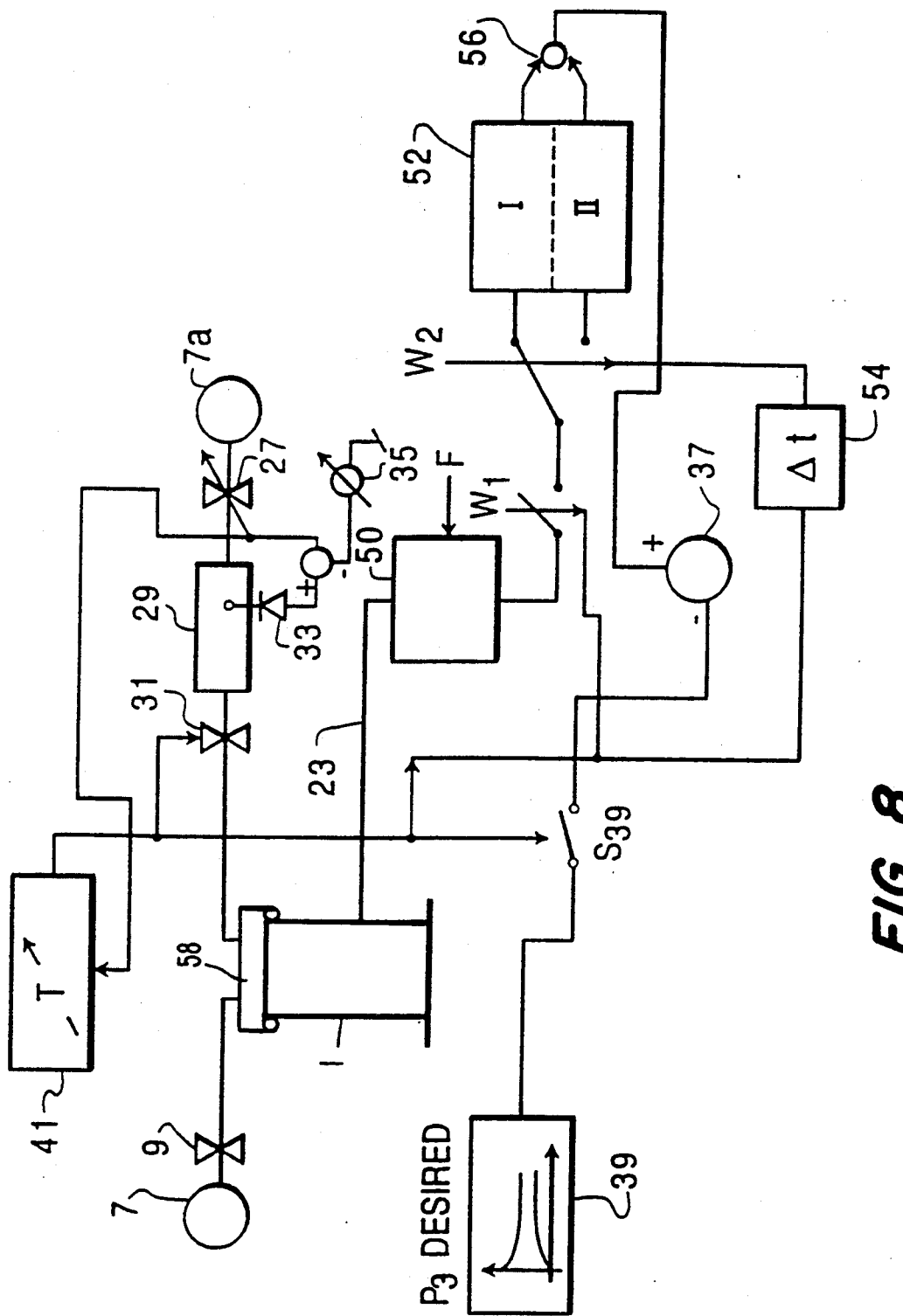

FIGS. 6-8 provide examples of alternate embodiments of the present invention respectively employing the principles of the embodiments described hereinabove in connection with FIGS. 4-5; however, the hollow body 1, fashioned as an open container such as, for example, a bottle, functions as the test chamber 3 of the embodiments of FIGS. 4-5.

More particularly, as shown in FIG. 6, the hollow body 1 is sealed by a suitable conventional plug or latch type sealing adaptor 58 and, during a pressure buildup phase between $t_1$ and $t_2$, the hollow body 1 is connected through the line 19 with one input $E_{19}$ of the pressure difference sensor 21. The second line 23, provided with the shut-off valve 25, connects the sealed hollow body 1 with the second input $E_{23}$ of the pressure difference sensor 21. At the time $t_R$, as shown in FIG. 2b, the shut-off valve 25 is closed so that the pressure prevailing at that time in the hollow body 1 remains built up in the section of line 23a between the shut-off valve 25 and the second input $E_{23}$ which is used as the reference pressure system. The testing is carried out in the same manner as described hereinabove in connection with the embodiment of FIG. 4.

As shown in FIG. 7, a test gas source such as, for example, pump 7a is connected by way of a shut-off valve 27 with a reference volume in a reference chamber 29. The reference chamber 29 is connected by way of a further shut-off valve 31 with the hollow body 1 sealed by the sealing adaptor 58. With the valve 27 being in an initially open position and the valve 31 shut, the source 7a fills the reference chamber with a test gas and the pressure sensor 33 is used to measure the pressure in the reference chamber 29. Once the pressure measured by the pressure sensor 33 attains the reference pressure adjusted at the reference signal source 35, the valve 27 is closed and the valve 31 is opened thus forming a communication system between the hollow body 1 and the reference chamber 29, with the test gas pressure being equalized in accordance with the volumes in the reference chamber 29 and the hollow body 1. Following an equalization phase corresponding to the time frame $t_1$, $t_2$ in FIG. 2b, the course of the pressure difference is measured using the pressure difference sensor 21 as described hereinabove in connection with FIG. 4, or at a given measuring time $t_m$, with any differences between a DESIRED pressure difference and an ACTUAL pressure difference being recorded as shown in FIG. 2b. In all other respects the embodiment of FIG. 7 functions in the same manner as indicated hereinabove in connection with FIG. 5.

In the embodiment of FIG. 8, prevailing pressure in the hollow body 1 may be tapped by the connecting line 23 arranged between the hollow body 1 and a pressure/electrical signal transducer 50 which may, for example, be an absolute pressure/electric signal transducer such as a piezo-transducer working against a reference force F. The electrical output of the transducer 50 representing the pressure prevailing in the hollow body 1 is led by way of the switch $W_1$ and the switch $W_2$ to a first storage area I of a conventional electronic storage unit 52 once the timer unit 41 activates the switch $W_1$ at a first point in time.

The timer unit 41, after a predetermined time interval, subsequently activates the switch $W_1$ at a point in time later than the first point in time so that the output signal of the transducer 50 is led to the secondary II of the storage unit 52 upon an activation of the switch $W_2$ by an output signal of a conventional time lag unit 54 formed either as a separate component from or an integral portion of the timer unit 41.

The data is processed and the testing proceeds in the same manner as described hereinabove in connection with FIG. 5a.

While I have shown and described several embodiments in accordance with the present invention, it is understood that the same is not limited thereto but is susceptible to numerous changes and modifications as known to one of ordinary skill in the art, and are therefore do not wish to be limited to the details shown and described herein, but intend to cover all such modifications as are encompassed by the scope of the appended claims.

I claim:

1. A method for at least one of testing tightness of a closed hollow body and a change in a volume of the closed hollow body caused by pressure stress applied to walls of the closed hollow body, the method comprising the steps of:
   placing said closed hollow body in a test chamber;
   exposing said closed hollow body to a one of a positive or negative pressure difference between an internal pressure of the closed hollow body and a pressure in the test chamber;
   tapping off the pressure prevailing in the test chamber at a first point in time;
   tapping off the pressure prevailing in the test chamber from said test chamber at a second point in time;
   generating an electrical signal in dependence upon pressure difference between values of the prevailing pressures at said first and second points in time; and
   determining at least one of the tightness and change in volume of the closed hollow body from the generated signal.

2. A method according to claim 1, further comprising the step of storing one of the prevailing pressure or a signal thereof tapped off at the test chamber at the first point in time.

3. A method according to claim 1, wherein the test chamber is initially provided with a positive or negative pressure.

4. A method according to claim 1, further comprising the step of evaluating the generated signal at least at one given point in time or continuously evaluating a course of the generated signal over a predetermined period of time.

5. A method according to claim 1, further comprising the step of comparing the generated signal with a predetermined value and concluding a lack of tightness of the hollow body as a result of the comparison.

6. A method for at least one of testing tightness of a hollow body and a change in a volume of the hollow body caused by pressure stress applied to walls of the hollow body, the method comprising the steps of:
   placing said hollow body in a test chamber;
   exposing said hollow body to a one of a positive or negative pressure difference between an internal pressure of the hollow body and a pressure in the test chamber;
   tapping off the pressure prevailing in the test chamber at a first point in time;
   tapping off the pressure prevailing in the test chamber from said test chamber at a second point in time;
   generating an electrical signal in dependence upon a pressure difference between values of the prevailing pressures at said first and second points in time;
   determining at least one of the tightness and change in volume of the hollow body from the generated signal; and
   providing a second chamber, loading said second chamber to a given pressure, and connecting said second chamber to the test chamber to generate the pressure differential.

7. A process for at least one of testing tightness of a hollow body and a change in a volume of the hollow body caused by a pressure stress applied to walls of the hollow body, the method comprising the steps of:
   exposing said hollow body to one of a positive or negative pressure difference between an internal pressure of the hollow body and a pressure outside said hollow body;
   connecting an interior of the hollow body to two differential inputs of a pressure difference sensor;
   interrupting the connection to one of the differential inputs at a predetermined position of a connecting line of one of said inputs to said interior of said hollow body thereby selecting said position so that a volume of a section of said connecting line between said position and said one input is considerably less than the volume of said interior of said hollow body and forming a reference pressure system by said section of said connecting line to hold pressure at said one input at level assumed at the moment of interrupting;
   monitoring a behavior of a pressure at the other of said two differential inputs with respect to the pressure at said one input; and determining at least one of the tightness and change in volume of the hollow body from an output signal of said pressure difference sensor.

8. A processing according to claim 7, wherein the pressure at said other of said two differential inputs is held constant by a negative feedback pressure control, and evaluating an adjusted controlled variable.

9. A process according to claim 8, wherein an amount of a pressure medium supplied to or removed from said interior of said hollow body per unit of time is evaluated as said controlled variable to hold said pressure at the other of said two differential inputs constant.

10. A process according to claim 7, comprising providing a second chamber, loading said second chamber to a given pressure, and connecting said second chamber to the interior of said hollow body to generate the pressure difference.

11. The process according to claim 10, wherein said interior of said hollow body is initially provided with a positive or negative pressure.

12. A process according to claim 7, further comprising the step of evaluating said output signal at least at one given point in time after the step of interrupting said connection or evaluating a course of said output signal continuously over a predetermined period of time.

13. The process according to claim 7, further comprising the step of comparing said output signal with a predetermined value and concluding a lack of tightness of the hollow body as a result of the comparison.

14. A method for at least one of leak testing and testing a change in volume of a hollow body, the method comprising the steps of;
introducing a pressure medium internally to said hollow body so as to apply an internal pressure to said hollow body different from an external pressure of said hollow body;
connecting said hollow body to a pressure difference sensor by first and second inputs;
closing a valve connecting said hollow body to said first input of said pressure difference sensor to provide a reference pressure value for said pressure difference sensor;
detecting the pressure of the hollow body over time at said second input of said pressure difference sensor;
comparing said reference pressure value and said detected pressure to provide information on the tightness of the hollow body; and
wherein the pressure in said hollow body is held constant over a given time period by introducing further pressure medium or releasing pressure medium from said hollow body, and wherein the amount of pressure medium introduced into or removed from said hollow body over said given time period is evaluated to provide said information on the tightness or volume of the hollow body.

15. A method of at least one of leak testing and testing a change in volume of a hollow body, the method comprising the steps of;
introducing a pressure medium internally to said hollow body so as to apply an internal pressure to said hollow body different from an external pressure of said hollow body;
connecting said hollow body to a pressure difference sensor by first and second inputs;
closing a valve connecting said hollow body to said first input of said pressure difference sensor to provide a reference pressure value for said pressure difference sensor;
detecting the pressure of the hollow body over time at said second input of said pressure difference sensor;
providing a reference chamber which is connected with the hollow body through a shut-off valve;
introducing pressure medium to said reference chamber to provide a predetermined pressure in said reference chamber with said valve closed;
opening said valve;
allowing pressure to equalize between the reference chamber and said hollow body to make-up the pressure initially applied to said hollow body; and
comparing said reference pressure value and said detected pressure to provide information on the tightness or volume of the hollow body.

16. A method for at least one of testing tightness of a hollow body and a change in a volume of the hollow body caused by pressure stress applied to walls of the hollow body, the method comprising the steps of:
exposing said hollow body to a cone of a positive or negative pressure difference between an internal pressure of the hollow body and a pressure outside the hollow body;
tapping off the pressure prevailing in the hollow body at a first point in time;
tapping off the pressure prevailing in the hollow body from said hollow body at a second point in time;
generating an electrical signal in dependence upon a pressure difference between values of the prevailing pressures at said first and second points in time;
determining at least one of the tightness and change in volume of the hollow body from the generated signal; and
providing a second chamber, loading said second chamber to a given pressure, and connecting said second chamber to the hollow body to generate the pressure difference.

17. A method according to claim 16, further comprising the step of storing one of the prevailing pressure or a signal thereof tapped off at the hollow body at the first point in time.

18. A method according to claim 16, wherein the hollow body is initially provided with a positive or negative pressure.

19. A method according to claim 16, further comprising the step of evaluating the generated signal at least at one given point in time or continuously evaluating a course of the generated signal over a predetermined period of time.

20. A method according to claim 16, further comprising the step of comparing the generated signal with a predetermined value and concluding a lack of tightness of the hollow body as a result of the comparison.

21. An apparatus for at least one of testing tightness of a hollow, body and detecting a change in a volume of the closed hollow body caused by pressure stresses applied to walls of the closed hollow body, the apparatus comprising;
at least one tightly closable test chamber for accommodating said closed hollow body;
pressure generating means for applying one of a positive or negative pressure to said test chamber;
means for tapping off a prevailing pressure in said test chamber;

timer means for controlling a point in time at which the prevailing pressure is tapped off from said test chamber; and difference forming means for generating an output signal in dependence upon a pressure difference of pressure tapped off the test chamber at two subsequent points in time, with said subsequent points in time being controlled by said timer means.

22. The apparatus according to claim 21, further comprising a control means for outputting a start signal for said timer means once a preselected pressure value is reached within said test chamber so as to initiate a control of the two subsequent points in time.

23. The apparatus according to claim 21, wherein said output signal is connected to one input of a difference forming unit, and wherein a reference signal source is connected to a second input of said difference forming unit.

24. The apparatus according to claim 23, wherein said reference signal source is adapted to provide a reference output signal varying in time.

25. An apparatus for at least one of the testing tightness of a hollow body and detecting a change in a volume of the hollow body caused by pressure stresses applied to walls of the hollow body, the apparatus comprising:

at least one tightly closable test chamber for accommodating said hollow body;

pressure generating means for applying one of a positive or negative pressure to said test chamber;

means for tapping off a prevailing pressure in said test chamber;

timer means for controlling a point in time at which the prevailing pressure is tapped off from said test chamber;

difference forming means for generating an output signal in dependence upon a pressure difference of pressure tapped off the test chamber at two subsequent points in time, with said subsequent points in time being controlled by said timer means; and wherein said output signal of said difference forming means is connected to an input of a difference forming unit, a reference signal source is connected to a second input of said difference forming unit, an output of said difference forming unit is adapted to control an adjustment of said pressure generating means so as to provide a negative feedback control of pressure generated by said pressure generating means within said test chamber on a value output from said reference signal source.

26. An apparatus for at least one of the testing tightness of a hollow body and detecting a change in a volume of the hollow body caused by pressure stresses applied to walls of the hollow body, the apparatus comprising:

at least one tightly closable test chamber for accommodating said hollow body;

pressure generating means for applying one of a positive or negative pressure to said test chamber;

means for tapping off a prevailing pressure in said test chamber;

timer means for controlling a point in time at which the prevailing pressure is tapped off from said test chamber;

difference forming means for generating an output signal in dependence upon a pressure difference of pressure tapped off the test chamber at two subsequent points in time, with said subsequent points in time being controlled by said timer means;

a shut-off valve for connecting said test chamber to a prechamber; and a further shut-off valve is provided for connecting said prechamber with said pressure generating means.

27. An apparatus for at least one of testing tightness of a hollow body and detecting a change in a volume of the hollow body caused by pressure stresses applied to walls of the hollow body, the apparatus comprising:

pressure generating means for applying one of a positive or negative pressure to an interior of said hollow body relative to a pressure surrounding said hollow body; and pressure difference sensor means provided with two differential inputs both connected to said interior of said hollow body, one of said inputs being connected to said interior of said hollow body by a shut-off valve means, wherein a section of a line from one of said inputs to said shut-off valve means has a volume considerably less than the volume of said interior of said hollow body.

28. An apparatus according to claim 27, wherein an output of said pressure difference sensor is connected to an input of a difference forming unit, a reference signal source is connected to a second input of said difference forming unit, an output of said difference forming unit is adapted to control an adjustment of said pressure generating means so as to provide a negative feedback control of said pressure generated by said pressure generating means within said interior of the hollow body on a value output from said reference signal source.

29. The apparatus according to claim 27, further comprising a shut-off valve for connecting said interior of said hollow body to a prechamber, and wherein a further shut-off valve is provided for connecting said prechamber with said pressure generating means.

30. The apparatus according to claim 27, further comprising a control means for outputting a shut control signal for said valve connected between one of said inputs of said pressure difference sensor once a preselected value is reached within said interior of said hollow body so as to store said predetermined pressure value at said one input of said pressure difference sensor as a reference pressure value.

31. The apparatus according to claim 27, wherein an output of said pressure difference sensor is connected to one input of a difference forming unit, and wherein a reference signal source is connected to a second input of said difference forming unit.

32. An apparatus according to claim 31, wherein said reference signal source is adapted to output a reference signal varying in time.

33. An apparatus for at least one of leak testing and testing a change in volume of a hollow body, the apparatus comprising:

a pressure medium source for introducing a pressure medium internally to said hollow body, said pressure medium source acting to maintain an internal pressure in said hollow body at a constant level over a given time period;

means for establishing a reference pressure value at a point in time when testing of the hollow body begins;

means for detecting pressure values in said hollow body over a given period of time;

means to record the amount of pressure medium supplied to or removed from said hollow body over said given period of time in order to maintain the pressure of the hollow body; and means for comparing said reference pressure value and said detected pressure values to obtain information about the tightness of the hollow body.

34. An apparatus according to claim 33, wherein said means to record comprise flow meters.

35. An apparatus for at least one of leak testing and testing a change in volume of a hollow body, the apparatus comprising:

a pressure medium source for introducing a pressure medium internally to said hollow body;

means for establishing a reference pressure value at a point in time when testing of the hollow body begins;

means for detecting pressure values in said hollow body over a given period of time;

a reference chamber connected between said hollow body and said pressure medium source including shut-off values between each of said hollow body and said pressure medium source; and means for comparing said reference pressure value and said detected pressure values to obtain information about the tightness of the hollow body.

36. An apparatus for at least one of leak testing and testing a change in volume of a hollow body, the apparatus comprising:

a pressure medium source for introducing a pressure medium internally to said hollow body;

means for establishing a reference pressure value at a point in time when testing of the hollow body begins;

means for detecting pressure values in said hollow body over a given period of time; and means for comparing said reference pressure value and said detected pressure values to obtain information about the tightness of the hollow body, and wherein said means for comparing comprise a pressure difference sensor, said means for establishing a reference pressure value connecting said hollow body and said pressure difference sensor through a shut-off valve, and said means for detecting pressure values directly connect said hollow body and said differential pressure sensor.

37. An apparatus for at least one of the testing tightness of a hollow body and detecting a change in a volume of the hollow body caused by pressure stresses applied to walls of the hollow body, the apparatus comprising;

pressure generating means for applying one of a positive or negative pressure to said hollow body;

means for tapping off a prevailing pressure in said hollow body;

timer means for controlling a point in time at which the prevailing pressure is tapped off from said hollow body;

difference forming means for generating an output signal in dependence upon a pressure difference of pressure tapped off the hollow body at two subsequent points in time, with said subsequent points in time being controlled by said timer means;

wherein said output signal of said difference forming means is connected to an input of a difference forming unit, a reference signal source is connected to a second input of said difference forming unit, an output of said difference forming unit is adapted to control an adjustment of said pressure generating means so as to provide a negative feedback control of pressure generated by said pressure generating means within said hollow body on a value output from said reference signal source.

38. An apparatus for at least one of the testing tightness of a hollow body and detecting a change in a volume of the hollow body caused by pressure stresses applied to walls of the hollow body, the apparatus comprising:

pressure generating means for applying one of a positive or negative pressure to said hollow body;

means for tapping off a prevailing pressure in said hollow body;

timer means for controlling a point in time at which the prevailing pressure is tapped off from said hollow body;

difference forming means for generating an output signal in dependence upon a pressure difference of pressure tapped off the hollow body at two subsequent points in time, with said subsequent points in time being controlled by said timer means;

a shut-off valve for connecting said hollow body to a prechamber; and a further shut-off valve is provided for connecting said prechamber with said pressure generating means.

39. The apparatus according to claim 38, further comprising a control means for outputting a start signal for said timer means once a preselected pressure value is reached within said hollow body so as to initiate a control of the two subsequent points in time.

40. The apparatus according to claim 38, wherein said output signal is connected to one input of a difference forming unit, and wherein a reference signal source is connected to a second input of said difference forming unit.

41. The apparatus according to claim 40, wherein said reference signal source is adapted to provide a reference output signal varying in time.

42. A method for testing a change in a volume of a hollow body caused by pressure stress applied to walls of the hollow body, the method comprising the steps of:

placing said hollow body in a test chamber;

exposing said hollow body to one of a positive or negative pressure difference between an internal pressure of the hollow body and a pressure in the test chamber;

tapping off the pressure prevailing in the test chamber at a first point in time;

tapping off the pressure prevailing in the test chamber from said test chamber at a second point in time;

generating an electrical signal in dependence upon a pressure difference between values of the prevailing pressures at said first and second points in time;

determining the change in volume of the hollow body from the generated signal.

43. A process of testing a change in a volume of a hollow body caused by a pressure stress applied to walls of the hollow body, the method comprising the steps of:

exposing said hollow body to one of a positive or negative pressure difference between an internal pressure of the hollow body and a pressure outside said hollow body;

connecting an interior of the hollow body to two differential inputs of a pressure difference sensor;

interrupting the connection to one of the differential inputs at a predetermined position of a connecting line of one of said inputs to said interior of said hollow body thereby selecting said position so that a volume of a section of said connecting line between said position and said one input is considerably less than the volume of said interior of said hollow body and forming a reference pressure system by said section of said connecting line to hold pressure at said one input at level assumed at the moment of interrupting;

monitoring a behavior of a pressure at the other of said two differential inputs with respect to the pressure at said one input; and determining the change in volume of the hollow body from an output signal of said pressure difference sensor.

44. A method of testing a change in volume of a hollow body, the method comprising the steps of:

introducing a pressure medium internally to said hollow body so as to apply an internal pressure to said hollow body different from an external pressure of said hollow body;

connecting said hollow body to a pressure difference sensor by first and second inputs;

closing a valve connecting said hollow body to said first input of said pressure difference sensor to provide a reference pressure value for said pressure difference sensor;

detecting the pressure of the hollow body over time at said second input of said pressure difference sensor;

providing a reference chamber which is connected with the hollow body through a shut-off valve;

introducing pressure medium to said reference chamber to provide a predetermined pressure in said reference chamber with said valve closed;

opening said valve;

allowing pressure to equalize between the reference chamber and said hollow body to make-up the pressure initially applied to said hollow body; and comparing said reference pressure value and said detected pressure to provide information on the volume of the hollow body.

45. A method of testing a change in volume of a hollow body caused by pressure stress applied to walls of the hollow body, the method comprising the steps of:

exposing said hollow body to a one of a positive or negative pressure difference between an internal pressure of the hollow body and a pressure outside the hollow body;

tapping off the pressure prevailing in the hollow body at a first point in time;

tapping off the pressure prevailing in the hollow body from said hollow body at a second point in time;

generating an electrical signal in dependence upon a pressure difference between values of the prevailing pressures at said first and second points in time; and determining the change in volume of the hollow body from the generated signal.

46. An apparatus for detecting a change in a volume of the hollow body caused by pressure stresses applied to walls of the hollow body, the apparatus comprising:

at least one tightly closable test chamber for accommodating said hollow body;

pressure generating means for applying one of a positive or negative pressure to said test chamber;

means for tapping off a prevailing pressure in said test chamber;

timer means for controlling a point in time at which the prevailing pressure is tapped off from said test chamber;

difference forming means for generating an output signal in dependence upon a pressure difference of pressure tapped off the test chamber at two subsequent points in time, with said subsequent points in time being controlled by said timer means.

47. An apparatus for detecting a change in a volume of the hollow body caused by pressure stresses applied to walls of the hollow body, the apparatus comprising:

pressure generating means for applying one of a positive or negative pressure to an interior of said hollow body relative to a pressure surround said hollow body; and pressure difference sensor means provided with two differential inputs both connected to said interior of said hollow body, one of said inputs being connected to said interior of said hollow body by a shut-off valve means, wherein a second of a line from one of said inputs to said shut-off valve means has a volume considerably less than the volume of said interior of said hollow body.

48. An apparatus for detecting a change in volume of a hollow body, the apparatus comprising:

a pressure medium source for introducing pressure medium to said hollow body;

means for establishing a reference pressure value at a point in time when testing of the hollow body begins;

means for detecting pressure values in said hollow body over a given period of time;

a reference chamber connected between said hollow body and said pressure medium source including shut-off values between each of said hollow body and said pressure medium source; and means for comparing said reference pressure value and said detected pressure values to obtain information about the tightness of the hollow body.

49. An apparatus for detecting a change in a volume of a hollow body caused by pressure stresses applied to the walls of the hollow body, the apparatus comprising:

pressure generating means for applying one of a positive or negative pressure to said hollow body;

means for tapping off a prevailing pressure in said hollow body;

time means for controlling a point in time at which the prevailing pressure is tapped off from said hollow body; and difference forming means for generating an output signal in dependence upon a pressure difference of pressure tapped off the hollow body at two subsequent points in time, with said subsequent points in time being controlled by said timer means.

* * * * *